Patented Apr. 1, 1930

1,752,746

UNITED STATES PATENT OFFICE

JAMES D. KLINGER AND CLETE L. BOYLE, OF DETROIT, MICHIGAN

COMPOSITION FOR AND PROCESS OF CLEANING METAL

No Drawing. Application filed June 20, 1929. Serial No. 372,530.

This invention relates to an improved composition to be used in the cleaning of metal preparatory to finishing the metal with paint, lacquer or enamel. The invention is more particularly directed to the use of a solvent for all mineral and vegetable oils and greases in combination with a rust attacking and removing acid for the purpose of removing oil, grease, rust and foreign matter from the metal.

An important object of the invention is to provide a solvent in a cleaning compound which is miscible with both mineral and vegetable oil in all proportions, and one in which the vapor tension is such that a minimum amount of evaporation occurs.

Heretofore compositions intended for cleaning compounds have included a rust attacking and removing acid and an oil solvent, such as butyl alcohol, di-acetone alcohol, ethyl alcohol, ethyl methyl ketone, mono-ethyl ether of ethylene glycol, ethyl acetate and the like. Some of these solvents possess good solvent properties for some of the oil and grease in certain proportions, but as a class their vapor tension is high and the evaporation thereof, particularly when used while hot, is rapid. It has not been possible, therefore, to commercially employ solvents in a hot condition with satisfactory results.

We have found that mono-butyl ether of ethylene glycol possesses the best qualities for such a solvent. It is a solvent for both mineral and vegetable oil in all proportions and its distillation range is very high as compared to other solvents heretofore used. It has a distillation range of approximately 300° F. to 350° F.

Mono-butyl ether of ethylene glycol has a boiling point approximately 70° F. higher than butyl alcohol and is soluble in water in all proportions, while butyl alcohol is only 10% soluble in water. When used in a water-acid solution this is a distinct advantage in favor of the former. Di-acetone alcohol and ethyl alcohol are not miscible with mineral oil. They have a much lower boiling point than mono-butyl ether of ethylene glycol and are relatively unstable in an acid solution, thus rendering them unsuitable for use in a hot solution. Ethyl methyl ketone has a low boiling point of approximately 150° F. to 196° F. and can only be used in an unheated solution. Its solvent properties for mineral and vegetable oils are much better than ethyl alcohol and di-acetone alcohol, but not nearly as effective as butyl alcohol or the mono-butyl ether of ethylene glycol. The mono-ethyl ether of ethylene glycol has a boiling point approximately 50° F. lower than the mono-butyl ether of ethylene glycol and does not have the solvent properties of the latter for mineral oil. Ethyl acetate and acetone have relatively low boiling points, unsuited for use in a hot solution and do not have solvent properties comparable with the mono-butyl ether of ethylene glycol.

From the foregoing it will be apparent that mono-butyl ether of ethylene glycol possesses the necessary qualities of a suitable solvent and when it is used with a rust attacking and removing acid, such as ortho-phosphoric acid, it makes a desirable cleaning compound. It has been found that by substituting mono-butyl ether of ethylene glycol for any of the solvents before mentioned, the amount of such solvent can be reduced about one half, thus reducing the cost of the cleaner.

We prefer to use a mixture of approximately 15 to 20% by volume of the mono-butyl ether of ethylene glycol, 35% by volume of 75% orthophosphoric acid and the remainder water. Heretofore, when mono-ethyl ether of ethylene glycol was used in a solution it was necessary to use approximately 35% as compared to the 15% to 20% of mono-butyl ether of ethylene glycol. This solution is very effective for removing oil, either mineral or vegetable, grease, rust and dirt from metal when applied in a hot condition. The cleaning action is very rapid. This composition is also excellent for dipping small parts in a tank of the solution that may be kept heated to insure more rapid cleaning. The mono-butyl ether of ethylene glycol very rapidly penetrates either a mineral or a vegetable oil film especially when applied in a heated condition.

If it is desired to insure the adhesive properties of this solution, a small percentage of a sugar solution may be added. When it is desired to further insure the viscosity of the solution, 10% by volume of a saturated sugar solution may be added. This organic product also tends to act as a corrosion inhibitor.

It will be understood that the proportions of the elements may be varied without departing from the spirit of our invention, and it is not our intention to limit its scope other than by the terms of the appended claims.

What we claim is:

1. A composition of matter to be used for cleaning metal, consisting of a rust removing acid and the mono-butyl ether of ethylene glycol.

2. A composition of matter to be used for cleaning metal consisting of orthophosphoric acid and mono-butyl ether of ethylene glycol.

3. A composition of matter to be used for cleaning metal, consisting of orthophosphoric acid and mono-butyl ether of ethylene glycol, the mono-butyl ether of ethylene glycol being by volume approximately one half that of the orthophosphoric acid.

4. A composition of matter to be used for cleaning metal, consisting of approximately 35% by volume of 75% orthophosphoric acid, 15% to 20% by volume of the mono-butyl ether of ethylene glycol and the remainder water.

5. The method of cleaning metal, which consists in applying a heated solution of orthophosphoric acid and the mono-butyl ether of ethylene glycol.

6. The method of cleaning metal, which consists in applying a heated solution of a rust removing acid and the mono-butyl ether of ethylene glycol.

JAMES D. KLINGER.
CLETE L. BOYLE.